United States Patent [19]

Mak

[11] Patent Number: 5,704,113
[45] Date of Patent: Jan. 6, 1998

[54] INJECTION MOLDING NOZZLE METHOD USING A TERMINAL LOCATING AND SEALING KEY

[75] Inventor: Chun Keung Mak, Markham, Canada

[73] Assignee: Mold-Masters Limited, Georgetown, Canada

[21] Appl. No.: 699,164

[22] Filed: Aug. 19, 1996

[30] Foreign Application Priority Data

Jul. 24, 1996 [CA] Canada .................. 2181964

[51] Int. Cl.⁶ .................. H05B 3/00; B29C 45/20
[52] U.S. Cl. .................. 29/611; 29/876; 219/421; 219/424; 219/541; 425/549
[58] Field of Search .................. 29/611, 845, 876; 425/549; 219/421, 424, 426, 541

[56] References Cited

U.S. PATENT DOCUMENTS

| | | |
|---|---|---|
| 5,235,737 | 8/1993 | Gellert . |
| 5,507,635 | 4/1996 | Gellert .................. 425/549 |
| 5,614,233 | 3/1997 | Gellert .................. 425/549 |

FOREIGN PATENT DOCUMENTS 2152664  6/1995  Canada .

*Primary Examiner*—P. W. Echols
*Attorney, Agent, or Firm*—Dalesman & Company

[57] ABSTRACT

A method of making an integral heated nozzle using a terminal locating and sealing key. A spiral portion of an electrical heating element is press fitted into a spiral groove in the cylindrical outer surface of an elongated inner portion. The remaining outwardly extending terminal portions of the heating element are inserted through two holes in the key and the key is pushed inwardly to a position against the inner portion. The key has a pin portion which is received in a matching hole in the inner portion to exactly determine the length of the spiral portion of the heating element and accurately locates the terminal portion of the heating element. An outer collar portion having a slot in which the key is received is then mounted in place around the rear end of the inner portion. A thermosetting ceramic sealant is applied in the space between the inner and outer collar portions then heated to integrally joint them together. The key fits in the slot in the outer collar portion to prevent leakage of the liquid sealant out through the slot.

4 Claims, 4 Drawing Sheets

FIG. 6

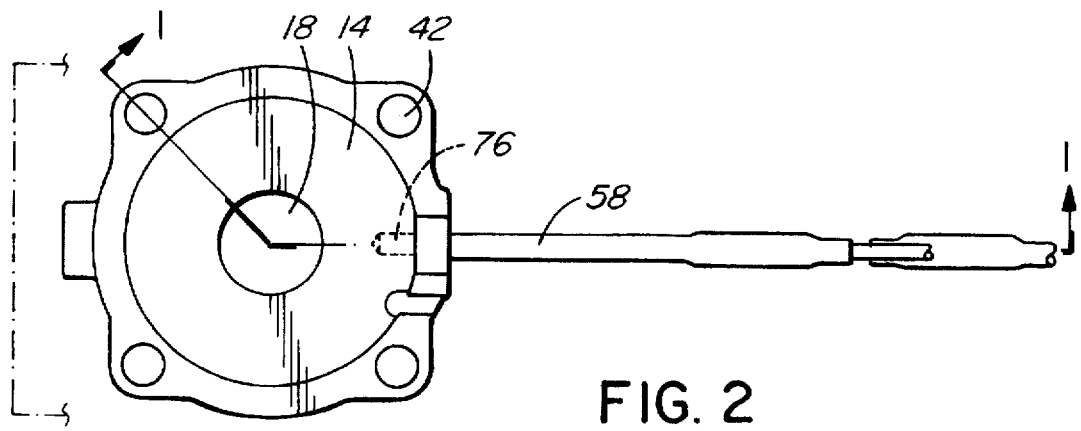
FIG. 2
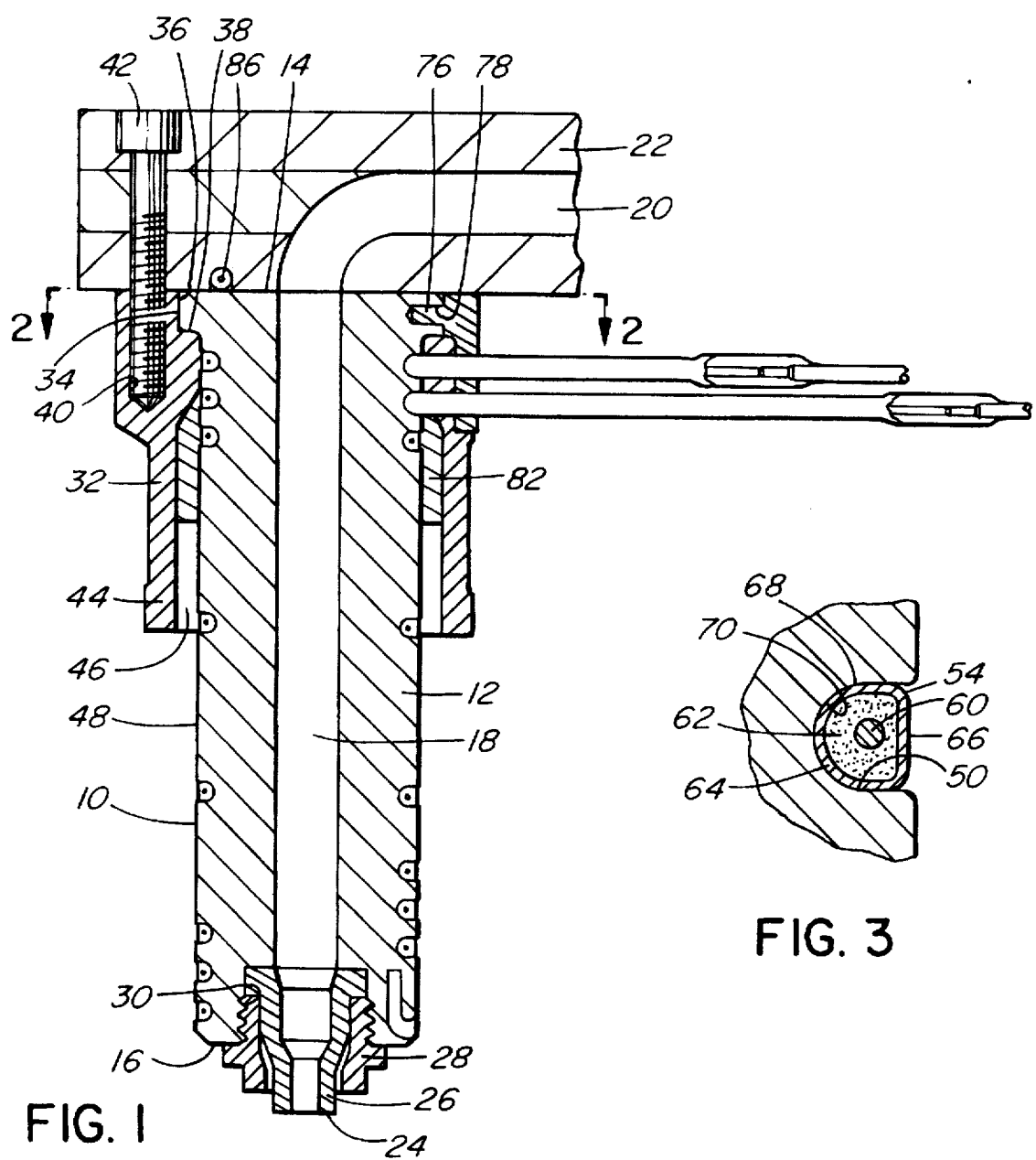
FIG. 1
FIG. 3

INJECTION MOLDING NOZZLE METHOD USING A TERMINAL LOCATING AND SEALING KEY

BACKGROUND OF THE INVENTION

This invention relates generally to injection molding and more particularly to a method of making a heated integral nozzle using a terminal locating and sealing key.

As shown in a number of patents such as U.S. Pat. No. 5,235,737 to Gellert which issued Aug. 17, 1993, it is well known to make integral injection molding nozzles having an outer collar portion and an electrical heating element by brazing them in a vacuum furnace. More recently, as shown in Canadian Patent Application Number 2,152,664 to Gellert filed Jun. 26, 1995, entitled "Injection Molding Nozzle with Pressed in Heating Element and Integral Collar Portion", integral nozzles can be made without heating them to a high temperature by press fitting the heating element into a spiral groove and securing the outer collar in place using a ceramic sealant. While these nozzles are very advantageous, the previous method of making them has the disadvantages that the beginning of the terminal portion of the heating element is not accurately located and that there is often some leakage of the liquid ceramic sealant.

SUMMARY OF THE INVENTION

Accordingly, it is an object of the present invention to at least partially overcome the disadvantages of the prior art by providing a method of making an integral injection molding nozzle using a terminal locating and sealing key.

To this end, in one of its aspects, the invention provides a method of making an injection molding nozzle having an elongated inner portion, an integral outer collar portion which fits around the inner portion, and an electrical heating element. The method includes forming the inner portion with a rear end, a front end, a melt bore extending therethrough from the rear end and a generally cylindrical outer surface with a spiral groove extending therearound. Part of the electrical heating element is press fitted into the spiral groove to form a spiral portion of the electrical heating element with one or more remaining terminal portion of the electrical heating element extending outwardly therefrom. The outer collar portion slides over the inner portion into an assembled position with the terminal portions of the heating element extending outwardly through a slot in the outer collar portion. The outer collar portion is secured in the assembled position adjacent the rear end of the inner portion by orienting the inner portion with the front end generally upward and applying thermosetting sealant between the inner portion and the surrounding outer collar portion. A terminal locating and sealing key is made to fit in the slot in the outer collar portion. The terminal locating and sealing key is made with engagement means to engage the inner portion and thereby rotationally locate the locating and sealing key relative to the inner portion. The locating and sealing key is made with one or more holes to receive the terminal portions of the heating element therethrough. The terminal locating and sealing key slides over the at least one terminal portion of the heating element into an assembled position in engagement with the inner portion of the nozzle. The outer collar portion slides into place with the terminal locating and sealing key received in the slot in the outer collar portion to prevent leakage of the thermosetting sealant therethrough.

Further objects and advantages of the invention will appear from the following description taken together with the accompanying drawings.

BRIEF DESCRIPTION OF THE DRAWINGS

FIG. 1 is a sectional view of a portion of an injection molding system showing a nozzle made according to a preferred embodiment of the invention, FIG. 2 is a plan view of the nozzle along line 2—2 in FIG. 1, FIG. 3 is an enlarged sectional view showing the heating element press fitted into the groove.

DETAILED DESCRIPTION OF THE INVENTION

Figure 4:
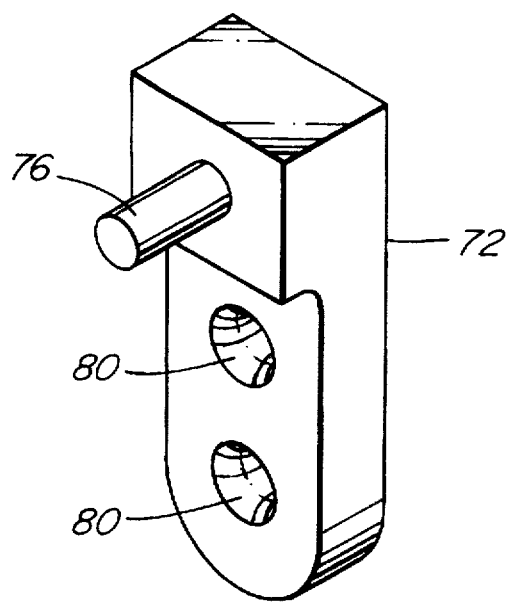
FIG. 4 is an isometric view of the terminal locating and sealing key seen in FIGS. 1 and 2.

Reference is first made to FIGS. 1 and 2 which shows an integral heated injection molding nozzle 10 made by the method of the present invention. The nozzle 10 has an elongated inner portion 12 with a rear end 14 and a front end 16. The nozzle 10 is seated in a mold (not shown) and has a central melt bore 18 extending through the inner portion 12 to receive melt from a melt passage 20 extending through a heated melt distribution manifold 22. While the front end 16 can have various configurations for different types of gating, in this case a nozzle seal 24 is shown having a hollow inner piece 26 and a threaded outer piece 28 screwed into a threaded seat 30.

The nozzle 10 also has an outer collar portion 32 which encircles the inner portion 12 adjacent its rear end 14. While the outer collar portion 32 is normally made of H13 hot work tool steel, the inner portion 12 may be made of a different material such as aluminum, stainless steel or a beryllium copper or beryllium nickel alloy having different thermal conductivities to provide the proper thermal balance for different materials or different types of gating such as thermal gating. The inner portion 12 of the nozzle 10 has an outwardly extending head 34 at its rear end 14. The head 34 fits tightly in a seat 36 in the outer collar portion 32 and abuts against an inwardly extending shoulder 38. In this case, the outer collar portion 32 has threaded holes 40 to receive screws 42 to secure it to the melt distribution manifold 22. The outer collar portion 32 has a cylindrical skirt 44 which extends forwardly around the inner portion 12 to locate the nozzle 10 in the mold (not shown). As can be seen, an insulative space 46 is provided between the cylindrical outer surface 48 of the inner core portion 12 and the surrounding skirt 44 of the outer collar portion 32.

Figure 5:
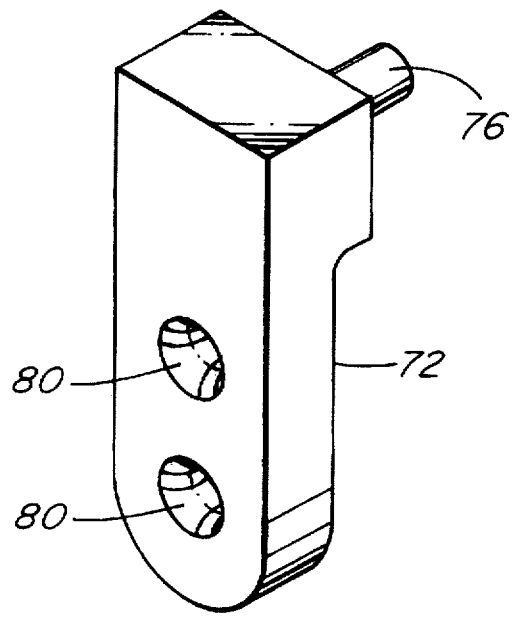
FIG. 5 is another isometric view of the same key from the other side.
Figure 6:
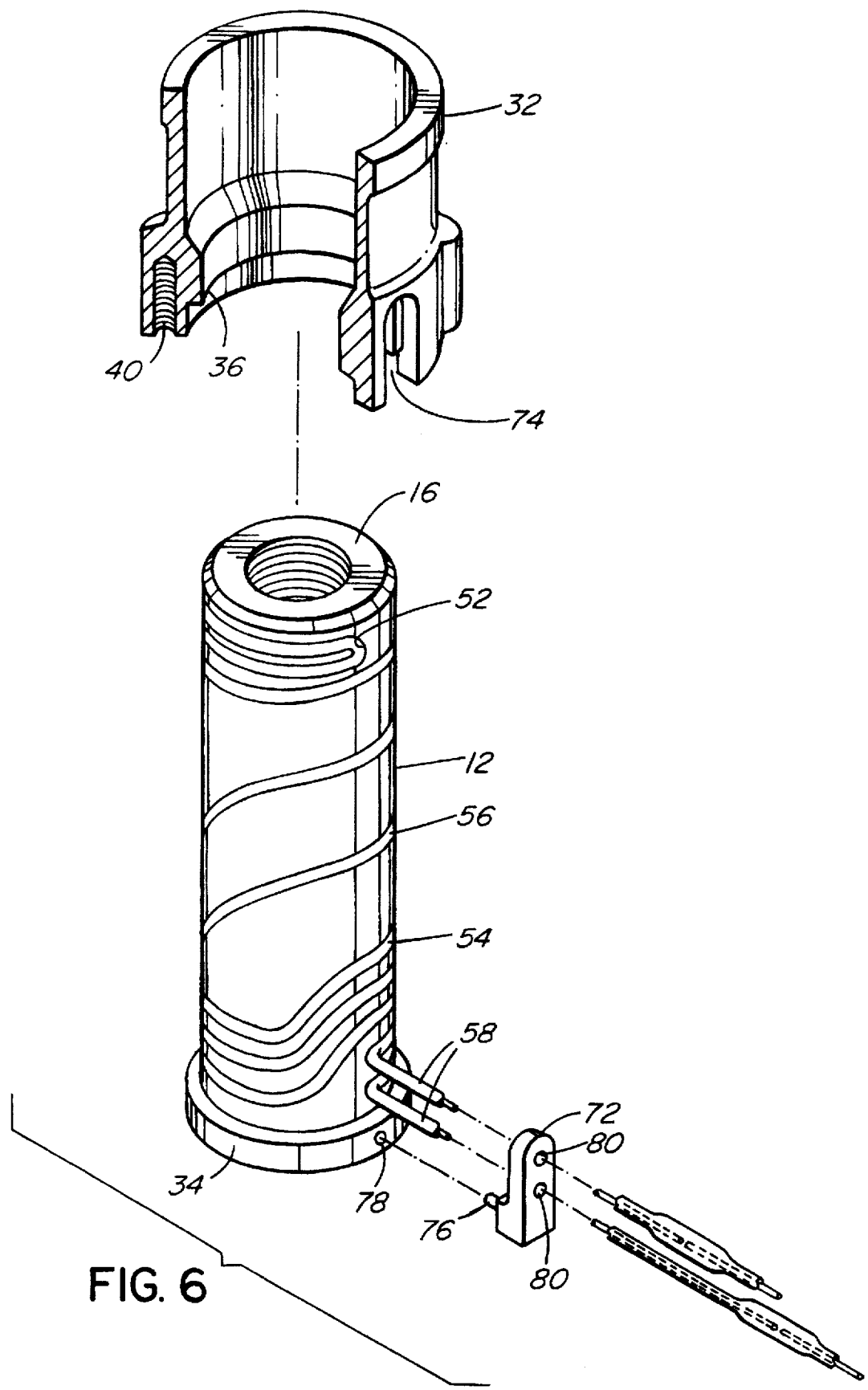
FIG. 6 is an isometric view showing the heating element pressed into place and the terminal locating and sealing key and the outer collar portion in position for assembly.
Figure 7:
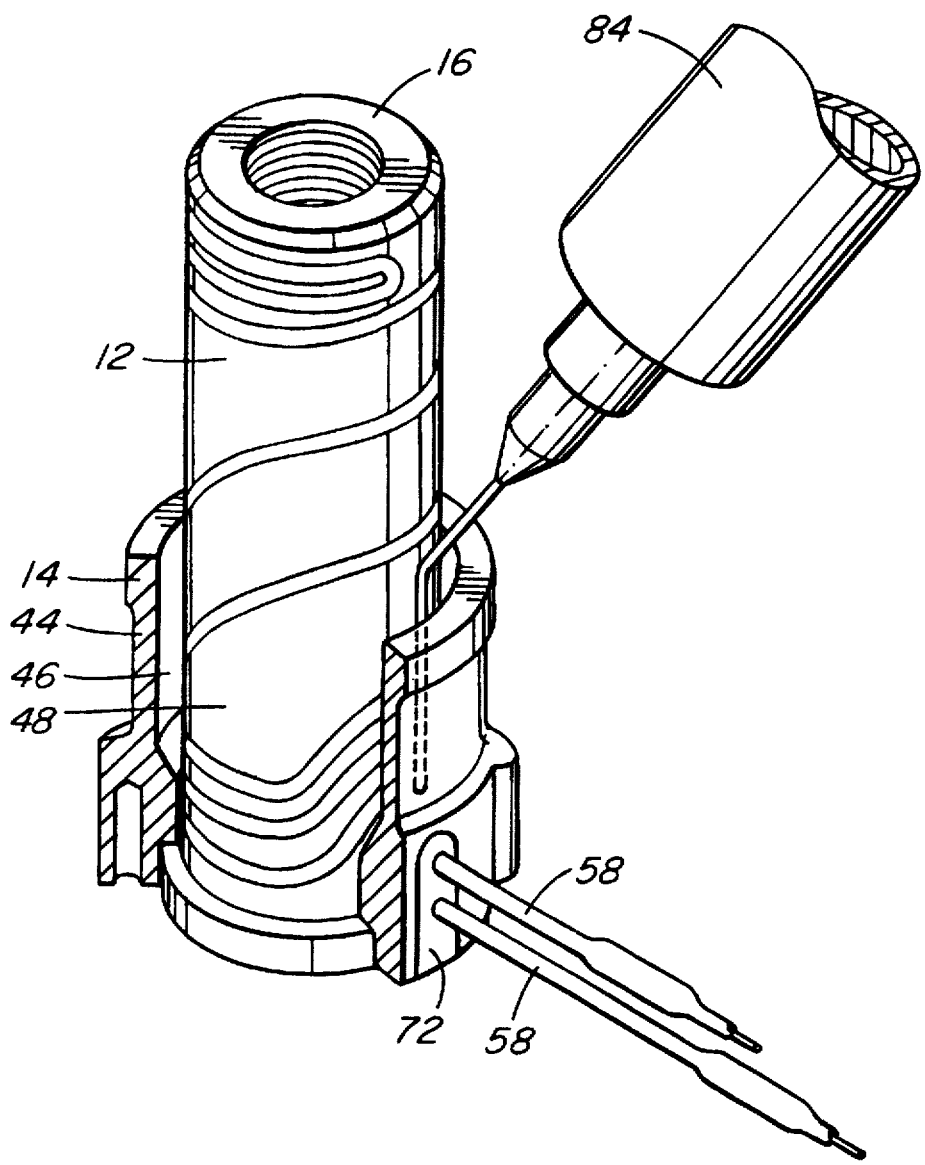
FIG. 7 is an isometric view showing the application of the thermosetting ceramic sealant.

Reference is now made to FIGS. 3–7 in describing a method of making the integral injection molding nozzle 10 according to a preferred embodiment of the invention. The inner portion 12 is made with a spiral groove 50 machined in its outer surface 48. While the groove 50 can have various configurations depending upon the thermal requirements of the nozzle 10, in this case, as seen in FIG. 6, the pitch of the groove 50 is tighter towards the rear and front ends 14, 16 where more heat is required due to greater heat loss. In this case, the groove 50 is a double groove extending from a U-shaped bend 52 adjacent the front end 16 of the inner portion 12.

An electrical heating element 54 is bent to fit the U-shaped bend 52 in the spiral groove 50 and then press fitted into the groove 50 as it is wound around the inner portion 12. This provides the heating element 54 with a spiral portion 56 extending in the groove 50 and two remaining terminal portions 58 extendfng radially outward therefrom. As seen in FIG. 3, the electrical heating element 54 has a resistance wire 60 extending in a refractory powder electrical insulating material 62 such as magnesium oxide powder inside an outer steel casing 64. Initially the heating element 54 has a circular cross-section with a diameter slightly less than the width of the spiral groove 50. However, press fitting the spiral portion 56 of the heating element 54 into the spiral groove 50 deforms it to have a flat outer side 66 and forces its outer surface 68 out into continuous contact with the inner surface 70 of the spiral groove 50. This contact ensures good heat transfer from the spiral portion 56 of the heating element 54 to the adjacent inner portion 12 of the nozzle 10.

As clearly seen in FIGS. 4 and 5, a terminal locating and sealing key 72 is made of a suitable material such as steel. The key 72 is made to fit in a slot 74 in the outer collar portion 32 and has a pin portion 76 extending inwardly therefrom which fits in a matching hole 78 in the head 34 of the inner portion 12. According to this embodiment of the invention, the key 72 is made with two holes 80 extending therethrough. The two terminal portions 58 of the heating element 54 are inserted through the two holes 80 and the terminal locating and sealing key 72 is pushed inwardly to the assembled position in which it abuts against the inner portion 12 and the pin portion 76 is received in the hole 78 in the inner portion 12. This accurately locates where the terminal portions 58 of the heating element 54 extend radially outward, determines exactly the length of the spiral portion 56 of the heating element 54 wound in the spiral groove 50, and prevents the spiral portion 56 of the heating element 54 from loosening even slightly in the spiral groove 50. In this embodiment, the key 72 is made with two holes 80 and the heating element 54 with two terminal portions 58 which are received through the two holes 80. In other embodiments the key 72 is made with only one hole and the heating element 54 with only one terminal portion which is received through the one hole.

Next, the outer collar portion 32 is mounted by sliding it over the front end 16 of the inner portion 12 to the assembled position in which the head 34 of the inner portion 12 is received in the seat 36 in the outer collar portion 32. The fit of the head 34 in the seat 36 is quite tight to accurately locate the inner portion 12 in the outer collar portion 32. Finally, the outer collar portion 32 is integrally secured in place around the inner portion 12 by applying thermosetting ceramic sealant 82 between them. After orienting the assembly in the upright position seen in FIG. 7, a predetermined quantity of a suitable liquid thermosetting ceramic sealant 82 such as CERAMABOND 668 (trade name of Aremco) is applied from a pneumatic dispensing tube 84 or syringe into the space 46 between the skirt 44 and the cylindrical outer surface 48 of the inner portion 12. The liquid thermosetting ceramic sealant 82 runs down and partially fills the space 46. The fit of the terminal locating and sealing key 72 in the slot 74 prevents the liquid sealant leaking out through the slot 74. The assembled nozzle is then heated in an oven to a temperature of approximately 200° C. to solidify the thermosetting ceramic sealant 82. This integrally secures the inner portion 12 and the outer collar portion 32 together without overheating the heating element 54. The terminal locating and sealing key 72 and the solidified sealant 82 prevent leakage of melt between them or around the two terminal portions 58.

In use, electrical power is applied to the heating element 86 in the melt distribution manifold 22 and to the heating elements 54 in the nozzles 10 to heat them to a predetermined operating temperature. Pressurized melt is applied from a molding machine (not shown) to the melt passage 20 in the melt distribution manifold 22 according to a predetermined injection cycle. The melt flows through the melt bore 18 in the nozzle 10 and through the two-piece nozzle seal 24 to a gate (not shown) in the mold. After the cavities are filled and a suitable packing and cooling period has expired, the injection pressure is released and the melt conveying system is decompressed to avoid stringing through the open gates. The mold is then opened to eject the molded products. After ejection, the mold is closed and the cycle is repeated continuously with a cycle time dependent upon the size of the cavities and the type of material being molded.

While the description of the method of making the injection molding nozzle 10 has been given with respect to a preferred embodiment, it will be evident that various other modifidations are possible without departing from the scope of the invention as understood by those skilled in the art and as defined in the following claims.

The embodiments of the invention in which an exclusive property or privilege is claimed is defined as follows:

1. In a method of making an injection molding nozzle having an elongated inner portion, an integral outer collar portion which fits around the inner portion, and an electrical heating element, including forming the inner portion with a rear end, a front end, a melt bore extending therethrough from the rear end and a generally cylindrical outer surface with a spiral groove extending therearound, press fitting part of the electrical heating element into the spiral groove to form a spiral portion of the electrical heating element with at least one remaining terminal portion of the electrical heating element extending outwardly therefrom, sliding the outer collar portion over the inner portion into an assembled position with the at least one terminal portion of the heating element extending outwardly through a slot in the outer collar portion, and securing the outer collar portion in the assembled position adjacent the rear end of the inner portion by orienting the inner portion with the front end generally upward and applying thermosetting sealant between the inner portion and the surrounding outer collar portion, the improvement comprising the further steps of:

making a terminal locating and sealing key which fits in the slot in the outer collar portion, the terminal locating and sealing key having engagement means to engage the inner portion and thereby rotationally locate the locating and sealing key relative to the inner portion, the locating and sealing key having at least one hole to receive the at least one terminal portion of the heating element therethrough, sliding the terminal locating and sealing key over the at least one terminal portion of the heating element into an assembled position in engagement with the inner portion of the nozzle, and sliding the outer collar portion into place with the terminal locating and sealing key received in the slot in the outer collar portion to prevent leakage of the thermosetting sealant therethrough.

2. A method as claimed in claim 1 including making the inner portion with a head at the rear end which extends outwardly past the outer surface, making the outer collar portion with an inwardly extending shoulder, and sliding the outer collar portion over the front end of the inner portion to the assembled position wherein the inwardly extending shoulder of the outer collar portion abuts against the head of the inner portion.

3. A method as claimed in claim 2 wherein the locating and sealing key is made with two holes therethrough and the inner portion is made with the spiral groove in the outer surface being a double groove extending rearwardly from a U-shaped bend adjacent the front end, whereby the heating element has two terminal portions, each extending outwardly through a respective one of the holes in the locating and sealing key.

4. A method as claimed in claim 3 wherein the engagement means is a pin portion which extends inwardly from the terminal locating and sealing key to fit in a matching hole in the inner portion of the nozzle.

* * * * *